(12) United States Patent
Uchida et al.

(10) Patent No.: US 6,458,870 B1
(45) Date of Patent: Oct. 1, 2002

(54) PROCESS FOR PREPARING AN AQUEOUS SOLUTION OF SULFANILIC ACID MODIFIED MELAMINE-FORMALDEHYDE RESIN AND A CEMENT COMPOSITION

(75) Inventors: Jun Uchida; Takaichi Sugiyama; Yuhji Sudoh; Keisuke Nakayama, all of Nei-gun (JP)

(73) Assignee: Nissan Chemical Industries, Ltd., Toyama (JP)

( * ) Notice: Subject to any disclaimer, the term of this patent is extended or adjusted under 35 U.S.C. 154(b) by 0 days.

(21) Appl. No.: 09/690,593

(22) Filed: Oct. 18, 2000

Related U.S. Application Data

(62) Division of application No. 09/420,235, filed on Oct. 19, 1999, now Pat. No. 6,214,965.

(30) Foreign Application Priority Data

Oct. 23, 1998 (JP) ............................................ 10-302033
Apr. 8, 1999 (JP) ............................................ 11-101029

(51) Int. Cl.$^7$ ................................................ C08K 3/00
(52) U.S. Cl. ................................................ 524/3; 524/6
(58) Field of Search .......................................... 524/3, 6

(56) References Cited

U.S. PATENT DOCUMENTS

| | | | | |
|---|---|---|---|---|
| 4,518,725 A | * | 5/1985 | Guicquero ...................... | 524/3 |
| 4,537,918 A | * | 8/1985 | Parcevaux et al. ............. | 524/3 |
| 5,789,526 A | | 8/1998 | Weichmann et al. ......... | 528/254 |

FOREIGN PATENT DOCUMENTS

| | | | | |
|---|---|---|---|---|
| DE | 441197 | 2/1927 | | |
| DE | 44 11 797 | 10/1995 | | |
| EP | 59353 | * 9/1982 | ................. | 524/843 |
| JP | A-55-7590 | 1/1980 | | |
| JP | 43012 | 3/1984 | ................. | 528/254 |
| JP | B2-1-40850 | 8/1989 | | |
| WO | 0 059 353 | 9/1982 | | |
| WO | 0 433 618 | 6/1991 | | |
| WO | 0 469 625 | 2/1992 | | |

* cited by examiner

Primary Examiner—Peter Szekely
(74) Attorney, Agent, or Firm—Oliff & Berridge, PLC

(57) ABSTRACT

The present invention relates to a process for preparing an aqueous solution of sulfonated melamine-formaldehyde resin, and a cement composition in which the solution and a setting retarder are added to a concrete, a mortar, a cement paste or the like. And the process comprises the following step (A), step (B) and step (C):

Step (A): a step of adjusting an aqueous solution containing melamine (a), formaldehyde (b), sulfanilic acid (c) and an alkali substance (d) to (a):(b):(c)=1:2.5–3.5:0.5–1.5 in molar ratio and its pH to 8.0–13.5, and thereafter heating the aqueous solution at 50–90° C. to conduct the reaction until free sulfanilic acid decreases to 40–90 mol % of the amount of sulfanilic acid charged;

Step (B): a step of adding an inorganic acid to the reaction liquid obtained in the step (A) to adjust its pH to 6.0–8.0, and thereafter heating the reaction liquid at 50–90° C. to conduct the reaction until free sulfanilic acid decreases to 20–60 mol % of the amount of sulfanilic acid charged;

Step (C): a step of adjusting a pH of the reaction liquid obtained in step (B) to 7.0–13.5.

9 Claims, No Drawings

US 6,458,870 B1

PROCESS FOR PREPARING AN AQUEOUS SOLUTION OF SULFANILIC ACID MODIFIED MELAMINE-FORMALDEHYDE RESIN AND A CEMENT COMPOSITION

This is a Division of application Ser. No. 09/420,235 filed Oct. 19, 1999, now U.S. Pat. No. 6,214,965. The entire disclosure of the prior application is hereby incorporated by reference herein in its entirety.

BACKGROUND OF THE INVENTION

1. Field of the Invention

The present invention relates to a process for preparing an aqueous solution of sulfonated melamine-formaldehyde resin, and a cement composition in which the solution and a setting retarder are added to a concrete, a mortar, a cement paste or the like.

2. Description of the Related Art

An aqueous solution of sulfonated melamine-formaldehyde resin has conventionally been used as a dispersant for cement for the purpose of increasing fluidity of a cement composition such as a concrete or a mortar, or decreasing a unit amount of water thereby increasing strength and durability.

Some proposals relating to the improvement in a process for preparing such a water reducing agent have been disclosed.

JP-A-55-7590 discloses a melamine-urea formaldehyde condensate modified with an aromatic aminosulfonic acid. Further, its molar ratio is defined such that the aromatic aminosulfonic acid to the total of melamine and urea is (0.2–1.0):1.0, and the molar ratio of melamine to urea is defined 0.75:0.25 to 0.30:0.70.

JP-B-1-40850 discloses a process for preparing an aqueous solution of melamine/aldehyde resin, which comprises:

step (a) of reacting 1 mole of melamine, 3.5–6 moles of formaldehyde and 0.5–1 moles of a compound 1 (wherein the compound 1 is at least one member selected from the group consisting of a sulfite of an alkali metal, a sulfite of an alkaline earth metal, a sulfate of an alkali metal, a sulfate of an alkaline earth metal, aminosulfonic acid, amino acid, aminodicarboxylic acid, hydroxycarboxylic acid, hydroxycarboxylic acid lactone, sulfanilic acid and sulfamic acid) in an alkaline medium having a pH of 9.0–13.0 in which water is present, at a temperature of 75–90° C.; step (b) of reacting the mixture obtained in the step (a) with 0.1–3 moles, per mole of melamine used in the step (a), of a compound 2 (wherein the compound 2 is at least one member selected from the group consisting of amino acid, aminocarboxylic acid, aminodicarboxylic acid, carboxylic acid, hydroxycarboxylic acid, hydroxycarboxylic acid lactone, sulfamic acid, sulfanilic acid, aminosulfonic acid, polyhydroxycarboxylic acid and polyhydroxycarboxylic acid lactone at a pH of 5.5–6.5 and a temperature of 75–90° C.; step (c) of adding a basic compound 3 (wherein the basic compound 3 is at least one member selected from the group consisting of an amine, a polyamine, an oxide of an alkali metal, a hydroxide of an alkaline metal, ammonium hydroxide, an oxide of an alkaline earth metal, monoethanol amine, diethanol amine, triethanol amine, a basic salt of a transition metal and a basic salt of zinc or aluminum) to the resin solution obtained in the step (b) to adjust a pH of the solution to 8.0–13.0, and then cooling the solution obtained in the step (c).

DE 441197 discloses a process for preparing an aqueous solution of sulfonated melamine-formaldehyde resin by adjusting the ratio of melamine, sulfanilic acid and formaldehyde to 1:1.1–1.5:3.3–3.6, adjusting a pH of a mixed solution to 5.0–7.0, heating the solution at 50–90° C., and adjusting a viscosity to 10–60 cSt (80° C.).

Conventional water reducing agents comprising a sulfonated melamine-formaldehyde resin as a main component have had the defect in that time for retaining fluidity of a cement composition is short, that is, the fluidity lowers with the passage of time. For this reason, the water reducing agent is mainly used in a concrete secondary product factory, it is used as a fluidizing agent in a ready-mixed concrete, and it is not well used in a ready-mixed concrete production plant. In particular, this tendency is strong in Japan.

In JP-A-55-7590, JP-B-1-40850 and DE 441197, it is difficult to prevent decrease of the fluidity, and it is therefore difficult to use in the ready mixed concrete production plant.

SUMMARY OF THE INVENTION

The present invention has been made in view of the above conventional problems.

One object of the present invention is to provide a process for preparing an aqueous solution of a water reducing agent using a sulfanilic acid modified melamine-formaldehyde resin which has high performance as a water reducing agent and prevents fluidity of a concrete from lowering with the passage of time, without time-extending for complete setting and entraining air.

Another object of the present invention is to provide a cement composition in which an aqueous solution of sulfonated melamine-formaldehyde resin (for example, a sulfanilic acid modified melamine-formaldehyde resin, or a melamine-formaldehyde resin modified with other sulfonating agents) and a setting retarder are added to a concrete, a mortar, a cement paste or the like.

A first aspect of the present invention is a process for preparing an aqueous solution of melamine-formaldehyde resin modified with sulfanilic acid, which comprises the following step (A), step (B) and step (C):

Step (A): a step of adjusting an aqueous solution containing melamine (a), formaldehyde (b), sulfanilic acid (c) and an alkali substance (d) to (a):(b):(c)=1:2.5–3.5:0.5–1.5 in molar ratio and its pH to 8.0–13.5, and thereafter heating the aqueous solution at 50–90° C. to conduct the reaction until free sulfanilic acid decreases to 40–90 mol % of the amount of sulfanilic acid charged;

Step (B): a step of adding an inorganic acid to the reaction liquid obtained in the step (A) to adjust its pH to 6.0–8.0, and thereafter heating the reaction liquid at 50–90° C. to conduct the reaction until free sulfanilic acid decreases to 20–60 mol % of the amount of sulfanilic acid charged;

Step (C): a step of adjusting a pH of the reaction liquid obtained in step (B) to 7.0–13.5.

A second aspect of the present invention is a cement composition comprising the aqueous solution of melamine-formaldehyde resin modified with sulfanilic acid, prepared by the process in the first aspect.

A third aspect of the present invention is a cement composition comprising the following component (I) and component (II):

Component (I): an aqueous solution of sulfonated melamine-formaldehyde resin obtained by a series of steps comprising of reacting (i) melamine, (ii) formaldehyde and (iii) a compound selected from the group consisting of a sulfate, a sulfite, a bisulfate, a bisulfite, a pyrosulfate, a pyrosulfite, sulfamic acid and sulfanilic acid in alkaline medium, conducting a condensation reaction by adding an acid, and then adding an alkali; and Component (II): a setting retarder.

A fourth aspect of the present invention is the cement composition as described in the third aspect, wherein sulfanilic acid is used as the compound (iii) in the production of component (I).

A fifth aspect of the present invention is the cement composition as described in the third aspect, wherein the compound (I) is an aqueous solution of melamine-formaldehyde resin modified with sulfanilic acid that is produced in the process as described in the first aspect.

A sixth aspect of the present invention is the cement composition as described any one of the third to fifth aspects, wherein the setting retarder of component (II) is aliphatic carboxylic acid, oxycarboxylic acid, oxycarboxylate, dicarboxylic acid, dicarboxylate, ketocarboxylic acid, ketocarboxylate, ligninsulfonate, sugar, hexafluorosilicate, cellulose ether, alkylaminophosphoric acid compound or their mixtures.

A seventh aspect of the present invention is the cement composition as described any one of the third to fifth aspects, wherein the setting retarder of component (II) is oxycarboxylate, lignin sulfonate, hexafluorosilicate or their mixtures.

PRACTICAL EMBODIMENT OF THE INVENTION

The melamine, formaldehyde and sulfanilic acid used in the step (A) in the first aspect of the present invention can be general industrial products, and can be commercially available. Examples of the industrial products of formaldehyde include formalin and paraformaldehyde. Examples of the preferable alkali that is added for pH adjustment include sodium hydroxide and potassium hydroxide.

In step (A), an amino group-containing compound other than malamine, such as urea, guanamine, dicyandiamide or thiourea, can be contained in the proportion of up to 0.2 mole, calculated as amino group in the amino group-containing compound, per mole of amino group in melamine.

The aqueous solution containing the component (a), component (b), component (c) and component (d) can be formed such that melamine, formaldehyde and sulfanilic acid are added to water as a medium in proportions such that formaldehyde is 2.5–3.5 moles per mole of melamine and sulfanilic acid is 0.5–1.5 moles per mole of melamine, and an alkali is added in an amount such that pH of the aqueous solution containing the components (a) to (d) is 8.0–13.5. The amount of those materials that are added to water as a medium to form a reaction mixture is preferably based on that melamine is about 5–70 parts by weight per 100 parts by weight of water. In either of the steps (A) to (C), concentration by, for example, concentration under reduced pressure or dilution by addition of water can be conducted.

In the step (A), the aqueous solution containing the components (a) to (d) thus formed is heated at the temperature of 50–90° C. preferably with stirring. During heating, pH of the aqueous solution is preferably maintained at 8.0 or higher. The heating is conducted until sulfanilic acid is decreased to 40–90 mol % of the amount thereof charged. The heating can generally be completed for about 10–180 minutes. In the step (A), methylol melamine is formed by the reaction of melamine and formaldehyde, and an initial condensate in which methylol melamine and sulfanilic acid are bonded in a certain form is formed. Thus, an aqueous solution of sulfanilic acid modified methylol melamine is formed in the step (A). The product after completion of the step (A) is a transparent liquid and generally has a pH of 8.0 or higher.

In the step (B), a solution having a pH of 6.0–8.0 is formed by adding an inorganic acid to the solution containing the initial condensate obtained in the step (A) after, preferably immediately after, completion of the step (A). Preferable examples of the inorganic acid added include mineral acids such as hydrochloric acid, sulfuric acid or nitric acid, and sulfamic acid. The solution thus prepared is heated to 50–90° C. The heating is conducted until sulfanilic acid added to the reaction mixture is decreased to 20–60 mol % of the amount thereof charged. The heating can generally be completed for about 10–360 minutes. The step (B) is a step to further bond unreacted sulfanilic acid that is present in the reaction liquid obtained in the step (A) with methylol melamine and also to form an aqueous solution of a melamine-formaldehyde resin modified with sulfanilic acid by polycondensation reaction between methylol groups in the initial condensate. At this time, the unreacted sulfanilic acid is decreased to 20–60 mol % of the amount of sulfanilic acid charged in the step (A). For example, where sulfanilic acid is decreased to 80 mol % of the amount thereof charged in the step (A), reaction is further conducted in the step (B) and heating is conducted until decreasing to 20–60 mol %. Further, where sulfanilic acid is decreased to 40 mol % in the step (A), reaction is further conducted until decreasing to a range of 20 to less than 40 mol % in the step (B).

In the step (C), an aqueous solution having a pH of 7.0–14.0 is formed by adding an alkali to the solution formed in the step (B) after, preferably immediately after, completion of the step (B). The added alkali that can be used is preferably the above-exemplified compounds used in the step (A). Thus, a water reducing agent aqueous solution of melamine-formaldehyde resin modified with sulfanilic acid of the present invention can be produced. (—$SO_3H$) or (—$SO_3M$) is formed depending on a pH of the resin aqueous solution obtained. M represents an alkali metal atom.

The aqueous solution of melamine-formaldehyde resin modified with sulfanilic acid obtained in the step (C) has a concentration of 15–60% by weight and a viscosity of 5–100,000 mPa·s.

If the proportion of formaldehyde to melamine is changed and formaldehyde is used in an amount of less than 2.5 moles per mole of melamine in the step (A), a large amount of free sulfanilic acid is present or it is difficult to form a melamine-formaldehyde resin, when heated in the step (B) Further, a water reducing agent having high performance is not obtained. Also, if formaldehyde is used in a large amount exceeding 3.5 moles per mole of melamine, stability of the resin becomes poor, which is not preferable. If the proportion of sulfanilic acid to melamine is changed and sulfanilic acid is used in an amount of less than 0.5 mole per mole of melamine, the liquid formed in the step (C) does not have a sufficient stability. Also, if sulfanilic acid is used in an amount exceeding 1.5 moles per mole of melamine, free sulfanilic acid in the step (B) exceeds 60 mol % of the charged amount, and the free sulfanilic acid is present in excess in the liquid, which is economically disadvantageous. If a pH of the reaction mixture is changed and adjusted to a pH lower than 8.0 in the step (A), melamine resin formation proceeds and an abnormal reaction such as gelation may occur. Further, even if the pH is adjusted to a pH exceeding 13.5, unnecessary alkali is consumed, which is not economical. If the heating temperature is changed and the heating is conducted at a temperature lower than 50° C. in the step (A), formation of the sulfanilic acid modified methylol melamine becomes slow and this is not suitable to the production process for industrial production. If the heating is conducted at a temperature higher than 90° C., by-products such as condensate of formaldehyde are formed, and a stable production cannot be carried out. If the heating is conducted until the detection degree of sulfanilic acid is less than 40 mol % in the step (A), the liquid obtained in the step (C) has good water reducing performance, but has poor fluidity retention effect. Further, if the step (B) is proceeded with the detection degree exceeding 90 mol %, resin formation is fast and an abnormal reaction such as gelation may occur.

If the pH is adjusted to less than 6.0 in the step (B), resin formation proceeds rapidly in the heating, which results in easy gelation. If the pH is adjusted to higher than 8.0, resin formation requires a long time. If the heating temperature is changed and heating is conducted at a temperature lower than 50° C. in the step (B), resin formation becomes slow, and if heating is conducted at a temperature higher than 90° C., resin formation becomes fast, which may result in unusual reaction such as gelation. If the heating time is 10 minutes or less in the step (B), the water reducing performance may become remarkably poor, and if it exceeds 360 minutes, gelation occurs in heating or a water reducing agent with high performance cannot be obtained. If the detection degree of sulfanilic acid in the step (B) is less than 20 mole %, water reducing performance is good, but fluidity retention effect is poor. If it exceeds 60 mol %, water reducing performance decreases.

If the pH is adjusted to less than 7.0 by adding an alkali in the step (C), resin formation proceeds during storage, and gelation occurs. Even if the pH is adjusted to a pH exceeding 13.5, stability of the resin does not change, and unnecessary alkali is consumed, which is not economical.

The second aspect of the present invention is the cement composition containing the aqueous solution of melamine-formaldehyde resin modified with sulfanilic acid obtained by the production process as described in the first aspect.

In more detail, the cement composition is such that the aqueous solution of melamine-formaldehyde resin modified with sulfanilic acid is added to a concrete, a mortar or a cement paste, and the resin aqueous solution can be added in the proportion of 0.1 to 5.0% by weight as a resin solid content based on the weight of the cement.

Further, as the third aspect of the present invention, the cement composition can be mentioned, which contains an aqueous solution of melamine-formaldehyde resin modified by sulfanilic acid as described in the first aspect or by a modifying agents other than sulfanilic acid, and the setting retarder.

In more detail, it is the cement composition containing an aqueous solution of the sulfonated melamine-formaldehyde resin for a water reducing agent as the component (I) and the setting retarder as the component (II).

The aqueous solution of sulfonated melamine-formaldehyde resin as the component (I) is an aqueous solution of a resin comprising a sulfonated melamine formaldehyde condensate obtained by a step of reacting (i) melamine, (ii) formaldehyde and (iii) a sulfonic acid group introducing agent in molar ratios of (i):(ii):(iii)= 1:2.5–3.5:0.5–1.5 in an alkali medium at a pH of 8.0–13.5, a step of conducting condensation reaction by the addition of an acid, and a step of adding an alkali. This aqueous solution has a pH of 7.0–13.5, a resin concentration of 15–60% by weight and a viscosity of 5–100,000 mPa·s.

The sulfonic acid group introducing agent (iii) is a compound selected from the group consisting of a sulfate, a sulfite, a bisulfate (i.e., hydrogensulfate), a bisulfite (i.e., hydrogensulfite), a pyrosulfate (i.e., disulfate), a pyrosulfite (i.e., disulfite), sulfamic acid (i.e., amidosulfuric acid) and sulfanilic acid (i.e., p-aminobenzenesulfonic acid). Examples of the above salts include salts of alkali metals such as lithium, sodium or potassium, salts of alkaline earth metals such as magnesium, calcium, strontium or barium, and ammonium salts. The sulfonic acid group introducing agent (iii) particularly preferably used is sulfanilic acid.

Examples of the alkali used for pH adjustment include sodium hydroxide and potassium hydroxide.

It is preferable for the aqueous solution of sulfonated melamine-formaldehyde resin as the component (I) to use an aqueous solution of melamine-formaldehyde resin modified with sulfanilic acid preferably produced by the process as described in the first aspect of the present invention.

Examples of the component (II) include aliphatic carboxylic acid, oxycarboxylic acid, oxycarboxylate, dicarboxylic acid, dicarboxylate, ketocarboxylic acid, ketocarboxylate, lignin sulfonate, sugar, hexafluorosilicate, cellulose ether, alkylaminophosphoric acid compounds, and their mixtures. Examples of the above salts include salts of alkali metals such as lithium, sodium or potassium, salts of alkaline earth metals such as magnesium, calcium, strontium or barium, and ammonium salts. Example of the aliphatic carboxylic acid includes heptanoic acid. Examples of the oxycarboxylic acid (hydroxycarboxylic acid) or its water-soluble salt include gluconic acid, glycolic acid, α-oxybutyric acid, citric acid, tartaric acid, malic acid, lactic acid, salicyclic acid (o-hydroxybenzoic acid), p-hydroxybenzoic acid, gallic acid and their water-soluble salts. Examples of the dicarboxylic acid or its water-soluble salt include maleic acid and its water-soluble salt. Examples of the ketocarboxylic acid or its water-soluble salt includes pyruvic acid and its water-soluble salt. Examples of the sugar include saccharose, glucose and malt sugar. Examples of the cellulose ether include methyl cellulose, ethyl cellulose, benzyl cellulose, trityl cellulose, cyan ethyl cellulose, carboxymethyl cellulose, carboxyethyl cellulose, aminoethyl cellulose and hydroxyethyl cellulose.

Particularly preferable component (II) is oxycarboxylate, lignin sulfonate, hexafluorosilicate or their mixtures. For example, sodium gluconate, sodium lignin sulfonate and magnesium hexafluorosilicate (i.e., magnesium silicofluoride). Those setting retarders can be used in the form of a solid, a powder or an aqueous solution.

The cement composition of the present invention is such that the component (I) and component (II) are added to a concrete, a mortar or a cement paste. The aqueous solution of sulfonated melamine-formaldehyde resin as a water reducing agent of the component (I) can be added in the proportion of 0.1–5.0% by weight in terms of a resin solid content based on the weight of the cement. Further, the setting retarder of the component (II) can be added in the proportion of 0.005–3.000% by weight in terms of a solid content based on the weight of the cement. Of the setting retarders, the gluconate can be added in the proportion of 0.01 to 0.10% by weight in terms of a solid content based on the weight of the cement, lignin sulfonate can be added in the proportion of 0.005–2.000% by weight in terms of a solid content based on the weight of the cement, and the hexafluorosilicate can be added in the proportion of 0.005–2.000% by weight in terms of a solid content based on the weight of the cement.

The present invention is described in more detail by reference to the following examples, but the invention is not limited thereto.

T1 to the conditions shown in Table 1. S detection degree (mol %) (=S det. degr.(mol %))in the step (A) and the step (B) in the Table shows the amount (mol %) of unreacted free sulfanilic acid remained in the aqueous solution based on the charged amount. The viscosity is expressed by mPa·s. The abbreviations in the Tables have the following meanings: aqu. sol. of wat. red. agent=aqueous solution of water reducing agent, conc.=concentration, visc.=viscosity.

TABLE 1

| aqu. sol. of wat. red. agent | step (A) | | | step (B) | | | | step (A) | | |
|---|---|---|---|---|---|---|---|---|---|---|
| | pH | T (° C.) | S det. degr. (mol %) | pH | T (° C.) | time (m) | S det. degr. (mol %) | pH | conc. (wt %) | visc. |
| T1 | 12.8 | 70 | 60 | 7.0 | 70 | 150 | 50 | 12.5 | 38 | 30 |
| T2 | 12.8 | 70 | 80 | 7.5 | 70 | 250 | 50 | 12.5 | 38 | 40 |
| T3 | 12.0 | 70 | 50 | 7.0 | 70 | 150 | 40 | 12.5 | 38 | 35 |
| T4 | 11.0 | 60 | 70 | 6.5 | 60 | 120 | 60 | 12.5 | 38 | 50 |
| T5 | 9.0 | 60 | 50 | 7.5 | 60 | 200 | 30 | 12.5 | 38 | 100 |
| T6 | 11.0 | 80 | 80 | 7.0 | 80 | 60 | 60 | 12.5 | 38 | 50 |

EXAMPLE 1

The following aqueous solutions of water reducing agent T1 to T6 were prepared. Preparation of water reducing agent T1:

Step (A): 326 g of water, 131 g of a 32 wt % aqueous solution of sodium hydroxide, 173 g of sulfanilic acid, 268 g of a 37 wt % aqueous solution of formaldehyde and 126 g of melamine were added with stirring to form an aqueous solution having a pH of 12.8. This aqueous solution was heated to 70° C. with stirring, and the heating was continued to maintain this temperature until the amount of sulfanilic acid, which was decided by liquid chromatography analysis, became 60% of the charged amount.

Step (B): Immediately after completion of the step (A) 88 g of water and 4 g of 75 wt % sulfuric acid were added to the solution with stirring to form a solution having a pH of 7.0. This solution was maintained at 70° C. with stirring and the heating was continued for 150 minutes.

Step (C): Immediately after completion of the step (B), a 32 wt % sodium hydroxide solution was added to the solution and cooled. By this procedure, an aqueous solution of melamine-formaldehyde resin modified with sulfanilic acid, having a concentration of 38%, a pH of 12.5 and a viscosity of 30 mPa·s was obtained. The amount of free sulfanilic acid was 50% of the charged amount. Preparation of water reducing agents T2 to T6:

An aqueous solutions of sulfanilic acid modified melamine-formaldehyde resin T2 to T6 were obtained in the step (C) by changing the conditions of Example 1 in the preparation of the aqueous solution of water reducing agent

EXAMPLE 2

Aqueous solutions of sulfanilic acid modified melamine-formaldehyde resin T7 to T10 were obtained in the step (C) by changing the conditions of Example 1 in the preparation of the water reducing agent aqueous solution T1 to the elements shown in Table 2, in which F/M means a molar ratio of formaldehyde/melamine, and S/M means a molar ratio of sulfanilic acid/melamine.

TABLE 2

| aqu. sol. of wat. red. agent | step (A) | | | step (B) | | | step (C) | | |
|---|---|---|---|---|---|---|---|---|---|
| | F/M | S/M | S det. degr. (mol %) | pH | time (m) | S det. degr. (mol %) | pH | conc. (wt %) | visc. |
| T7 | 2.5 | 1.0 | 60 | 7.0 | 280 | 50 | 12.5 | 38 | 80 |
| T8 | 3.5 | 1.0 | 60 | 6.5 | 120 | 40 | 12.5 | 38 | 60 |
| T9 | 3.0 | 1.5 | 70 | 7.0 | 200 | 60 | 12.5 | 41 | 40 |
| T10 | 3.0 | 0.5 | 60 | 7.0 | 150 | 40 | 12.5 | 33 | 60 |

EXAMPLE 3

A concrete was prepared with unit amounts of water/cement ratio (W/C):47%, fine aggregate degree (s/a):44%, cement: 350 kg/m$^3$, water: 165 kg/m$^3$, fine aggregate (S): 777 kg/m$^3$ and coarse aggregate (G): 997 kg/m$^3$. The cement was normal Portland cement, the fine aggregate was sand produced in Toyama, and the coarse aggregate was crushed stone 2005 produced in Hachioji. Each of the water reducing agent aqueous solutions T1 to T10 obtained by the production process of the present invention and sodium gluconate were blended in the proportion to the cement as shown in Table 3, and the change with time in slump value was measured. (C×%) in Table 3 shows the amount (wt % solid content) of the water reducing agent aqueous solution and the setting retarder added to the cement.

Further, as a commercially available water reducing agent, an aqueous solution of sulfonated melamine-formaldehyde resin modified with sodium sulfite (T11) having a pH of 12, a concentration of 35 wt % and a viscosity of 30 mPa·s and an aqueous solutin of sulfonated melamine-formaldehyde resin modified with sodium sulfite (T12) having a pH of 8, a concentration of 23 wt % and a viscosity of 8 mPa·s were used.

Further, a setting retarder (S1) comprising sodium gluconate as a main component, a setting retarder (S2) comprising sodium lignin sulfonate as a main component or a setting retarder (S3) comprising magnesium hexafluorosilicate as a main component was used as an aggregation and setting retarding component of the cement composition.

Concrete (40 liters) was produced using a 50 liters pan type forced kneading mixer. The kneading method was that a mortar having a water reducing agent aqueous solution added thereto was kneaded for 30 seconds, coarse aggregates were introduced therein, and the resulting mixture was kneaded for 90 seconds and then discharged from the mixer. The slump was measured immediately after discharging the concrete from the mixer, after 30 minutes from the discharging and after 60 minutes from the discharging. The concrete after discharging was agitated in a 50 liters gravity type mixer at 2 rpm and then stored. Amount of air in a fresh concrete was adjusted to 4.5% with AE agent (air entraining agent).

The results of tests conducted based on the above test methods are shown in Table 3.

TABLE 3

| water reducing agent | | setting retarder | | change in slump value (cm) | | |
|---|---|---|---|---|---|---|
| | added amount | | added amount | | 30 minutes | 60 minutes |
| No. | C × % | No. | C × % | immediately | after the discharge | |
| T1 | 0.4 | — | 0 | 18.5 | 15.5 | 13.0 |
| T2 | 0.4 | — | 0 | 17.0 | 16.0 | 12.5 |
| T3 | 0.4 | — | 0 | 18.0 | 15.0 | 12.5 |
| T4 | 0.4 | — | 0 | 18.0 | 15.5 | 13.0 |
| T5 | 0.4 | — | 0 | 19.0 | 16.5 | 13.5 |
| T6 | 0.4 | — | 0 | 18.5 | 16.0 | 12.5 |
| T7 | 0.5 | — | 0 | 17.0 | 15.0 | 12.0 |
| T8 | 0.4 | — | 0 | 18.0 | 16.5 | 12.5 |
| T9 | 0.4 | — | 0 | 17.5 | 15.0 | 12.0 |
| T10 | 0.5 | — | 0 | 18.5 | 16.0 | 13.5 |
| T11 | 0.6 | — | 0 | 17.0 | 11.0 | 5.0 |
| T12 | 0.6 | — | 0 | 17.5 | 8.5 | 3.5 |
| T1 | 0.4 | S1 | 0.02 | 18.5 | 18.0 | 17.5 |
| T1 | 0.4 | S2 | 0.02 | 19.0 | 16.5 | 16.0 |
| T1 | 0.4 | S3 | 0.02 | 18.5 | 17.5 | 15.0 |
| T2 | 0.4 | S1 | 0.02 | 18.5 | 17.5 | 16.0 |
| T2 | 0.4 | S2 | 0.02 | 17.5 | 16.0 | 14.5 |
| T2 | 0.4 | S3 | 0.02 | 18.5 | 17.5 | 15.0 |
| T11 | 0.6 | S1 | 0.02 | 18.0 | 13.5 | 8.0 |
| T12 | 0.6 | S1 | 0.02 | 18.0 | 11.0 | 7.0 |
| T1 | 0.4 | S1 | 0.05 | 18.0 | 18.0 | 17.0 |
| T1 | 0.4 | S2 | 0.05 | 17.5 | 16.0 | 15.0 |
| T1 | 0.4 | S3 | 0.05 | 18.0 | 16.5 | 15.5 |
| T2 | 0.4 | S1 | 0.05 | 18.5 | 17.0 | 15.5 |
| T2 | 0.4 | S2 | 0.05 | 17.5 | 17.0 | 15.0 |
| T2 | 0.4 | S3 | 0.05 | 18.0 | 16.5 | 15.0 |
| T11 | 0.6 | S1 | 0.05 | 18.5 | 14.0 | 9.5 |
| T12 | 0.6 | S1 | 0.05 | 17.0 | 13.5 | 8.5 |
| T1 | 0.4 | S1 | 0.10 | 19.0 | 19.5 | 19.5 |
| T1 | 0.4 | S2 | 0.10 | 18.0 | 18.0 | 16.5 |
| T1 | 0.4 | S3 | 0.10 | 18.0 | 17.0 | 17.0 |
| T2 | 0.4 | S1 | 0.10 | 18.5 | 18.0 | 19.0 |
| T2 | 0.4 | S2 | 0.10 | 17.5 | 18.0 | 16.0 |
| T2 | 0.4 | S3 | 0.10 | 18.0 | 17.5 | 16.5 |
| T3 | 0.4 | S1 | 0.10 | 18.5 | 18.0 | 18.0 |
| T4 | 0.4 | S1 | 0.10 | 19.0 | 18.5 | 18.0 |
| T5 | 0.4 | S1 | 0.10 | 18.0 | 19.0 | 17.5 |
| T6 | 0.4 | S1 | 0.10 | 17.0 | 17.5 | 18.5 |
| T7 | 0.5 | S1 | 0.10 | 17.5 | 17.0 | 18.0 |
| T8 | 0.4 | S1 | 0.10 | 18.5 | 18.5 | 17.0 |
| T9 | 0.4 | S1 | 0.10 | 19.0 | 19.0 | 19.0 |
| T10 | 0.5 | S1 | 0.10 | 18.5 | 18.0 | 17.5 |
| T11 | 0.6 | S1 | 0.10 | 18.0 | 15.0 | 9.5 |
| T12 | 0.6 | S1 | 0.10 | 19.0 | 14.5 | 9.0 |
| T1 | 0.4 | S1 | 0.20 | 17.5 | 18.5 | 19.0 |
| T1 | 0.4 | S2 | 0.20 | 17.5 | 18.0 | 17.0 |
| T1 | 0.4 | S3 | 0.20 | 18.0 | 17.0 | 16.5 |
| T2 | 0.4 | S1 | 0.20 | 18.0 | 19.0 | 18.5 |
| T2 | 0.4 | S2 | 0.20 | 17.0 | 16.0 | 16.0 |
| T2 | 0.4 | S3 | 0.20 | 17.5 | 16.0 | 15.5 |
| T11 | 0.6 | S1 | 0.20 | 18.0 | 15.0 | 10.0 |
| T12 | 0.6 | S1 | 0.20 | 18.5 | 16.0 | 9.5 |

When the setting retarder is added in an amount of 0.005% or more by weight as a solid content based on the weight of the cement, the effect thereof is exhibited, and the effect is markedly exhibited by adding 0.02% by weight or more of the setting retarder. The effect reaches its saturation when the setting retarder is added in an amount of 3.00% by weight as a solid content, and addition exceeding 3.00% by weight does not provide an economical effect that is commensurate with the addition amount.

When the same amount of setting retarders is added, the gluconate represented by sodium gluconate exhibits the most excellent retardation effect (fluidity retention effect), and the ligninsulfonate represented by sodium lignin sulfonate and the hexafluorosilicate represented by sodium hexafluorosilicate are next best.

The most preferable combination is the aqueous solution of melamine-formaldehyde resin modified with sulfanilic acid as a water reducing agent of the component (I) and the setting retarder of the component (II), but a combination of the A aqueous solution of sulfonated melamine-formaldehyde resin prepared with sodium sulfite that is conventionally used as the component (I) and the above setting retarder of the component (II) can also be applied.

According to the present invention, when the aqueous solution of melamine-formaldehyde resin modified with sulfanilic acid obtained in the step (C) by controlling the reaction rate of sulfanilic acid in the step (A) and the step (B) is added to a cement composition as a water reducing agent, the cement composition has excellent water reducing performance and high fluidity retention effect. Therefore, even if a mortar or a concrete is produced and then allowed to stand for hours for various reasons, the cement composition can easily be poured into a mold frame or the like.

Further, if the aqueous solution of melamine-formaldehyde resin modified with sulfanilic acid is used in combination with a setting retarder, i.e., a substance that retards hydration and setting reaction of a cement composition, it becomes possible to further increase the fluidity retention effect of the melamine-formaldehyde resin and sulfanilic acid modified melamine-formaldehyde resin.

Further, addition of the setting retarder to a concrete or a mortar exhibits the fluidity retention effect by a method of adding the setting retarder in the form of a solid, a method of adding the setting retarder in the form of an aqueous solution or a method of dissolving the setting retarder in a chemical miscible agent including an aqueous solution of a water reducing agent and then adding the resulting mixture. The time when the setting retarder is added is considered the case of simultaneously adding the same together with the water reducing agent and water, the case of adding the same to a cement or an aggregate or the case of adding the same after preparing a concrete or a mortar. However, use of either method can exhibit the fluidity retention effect.

The concrete or mortar having thus increased fluidity retention effect can be applied to concrete product factories in which the melamine-formaldehyde resin has conventionally been used, and also to a ready mixed concrete or the like in which the melamine-formaldehyde resin has not conventionally been used so much. Further, such a concrete or mortar is very effective in a summer season in which decrease in fluidity with time particularly becomes a problem, or in preventing decrease in fluidity with time in the case that a kneading temperature of a concrete is relatively high.

What is claimed is:

1. A cement composition comprising:
   a cement component selected from the group consisting of concrete, mortar, and a cement paste, and
   an aqueous solution of melamine-formaldehyde resin modified with sulfanilic acid;
   wherein the aqueous solution is prepared by a first step comprising adjusting an aqueous solution of melamine (a), formaldehyde (b), sulfanilic acid (c), and an alkali substance (d) to (a):(b):(c)=1:2.5–3.5:0.5–1.5 in molar ratio and its pH to 8.0–13.5, and thereafter heating the aqueous solution at 50–90° C. to conduct the reaction until free sulfanilic acid decreases to 40–90 mol % of the amount of sulfanilic acid charged;
   wherein the aqueous solution is further prepared by a second step comprising adding an inorganic acid to the reaction liquid obtained in the first step to adjust its pH to 6.0–8.0, and thereafter heating the reaction liquid at 50–90° C. to conduct the reaction until free sulfanilic acid decreases to 20–60 mol % of the amount of sulfanilic acid charged; and
   wherein the aqueous solution is further prepared by a third step comprising adjusting a pH of the reaction liquid obtained in the second step to 7.0–13.5.

2. The cement composition according to claim 1, further comprising a setting retarder.

3. A cement composition comprising:
   a cement component selected from the group consisting of concrete, mortar, and a cement paste, and the following components (I) and (II):
      component (I): an aqueous solution of sulfonated melamine-formaldehyde resin obtained by a series of steps comprising reacting (i) melamine, (ii) formaldehyde and (iii) sulfanilic acid in an alkaline medium, conducting a condensation reaction by adding an acid, and then adding an alkali; and
      component (II): a setting retarder.

4. The cement composition according to claim 3, wherein the setting retarder of component (II) is selected from the group consisting of aliphatic carboxylic acid, oxycarboxylic acid, oxycarboxylate, dicarboxylic acid, dicarboxylate, ketocarboxylic acid, ketocarboxylate, lignin sulfonate, sugar, hexafluorosilicate, cellulose ether, alkylaminophosphoric acid compound and mixtures thereof.

5. The cement composition of claim 3, wherein the setting retarder of component (II) is selected from the group consisting of oxycarboxylate, lignin sulfonate, hexafluorosilicate and mixtures thereof.

6. The cement composition according to claim 3, wherein the setting retarder of component (II) is selected from the group consisting of aliphatic carboxylic acid, oxycarboxylic acid, oxycarboxylate, dicarboxylic acid, dicarboxylate, ketocarboxylic acid, ketocarboxylate, lignin sulfonate, sugar, hexafluorosilicate, cellulose ether, alkylaminophosphoric acid compound and mixtures thereof.

7. The cement composition according to claim 3, wherein the setting retarder of component (II) is selected from the group consisting of oxycarboxylate, lignin sulfonate, hexafluorosilicate and mixtures thereof.

8. The cement composition of claim 7, wherein the setting retarder is selected from the group consisting of aliphatic carboxylic acid, oxycarboxylic acid, oxycarboxylate, dicarboxylic acid, dicarboxylate, ketocarboxylic acid, ketocarboxylate, lignin sulfonate, sugar, hexafluorosilicate, cellulose ether, alkylaminophosphoric acid compound and mixtures thereof.

9. The cement composition of claim 7, wherein the setting retarder is selected from the group consisting of oxycarboxylate, lignin sulfonate, hexafluorosilicate and mixtures thereof.

* * * * *